April 26, 1966 A. URIBE M. 3,247,989
BARREL TRUCK
Filed July 8, 1963 2 Sheets-Sheet 1
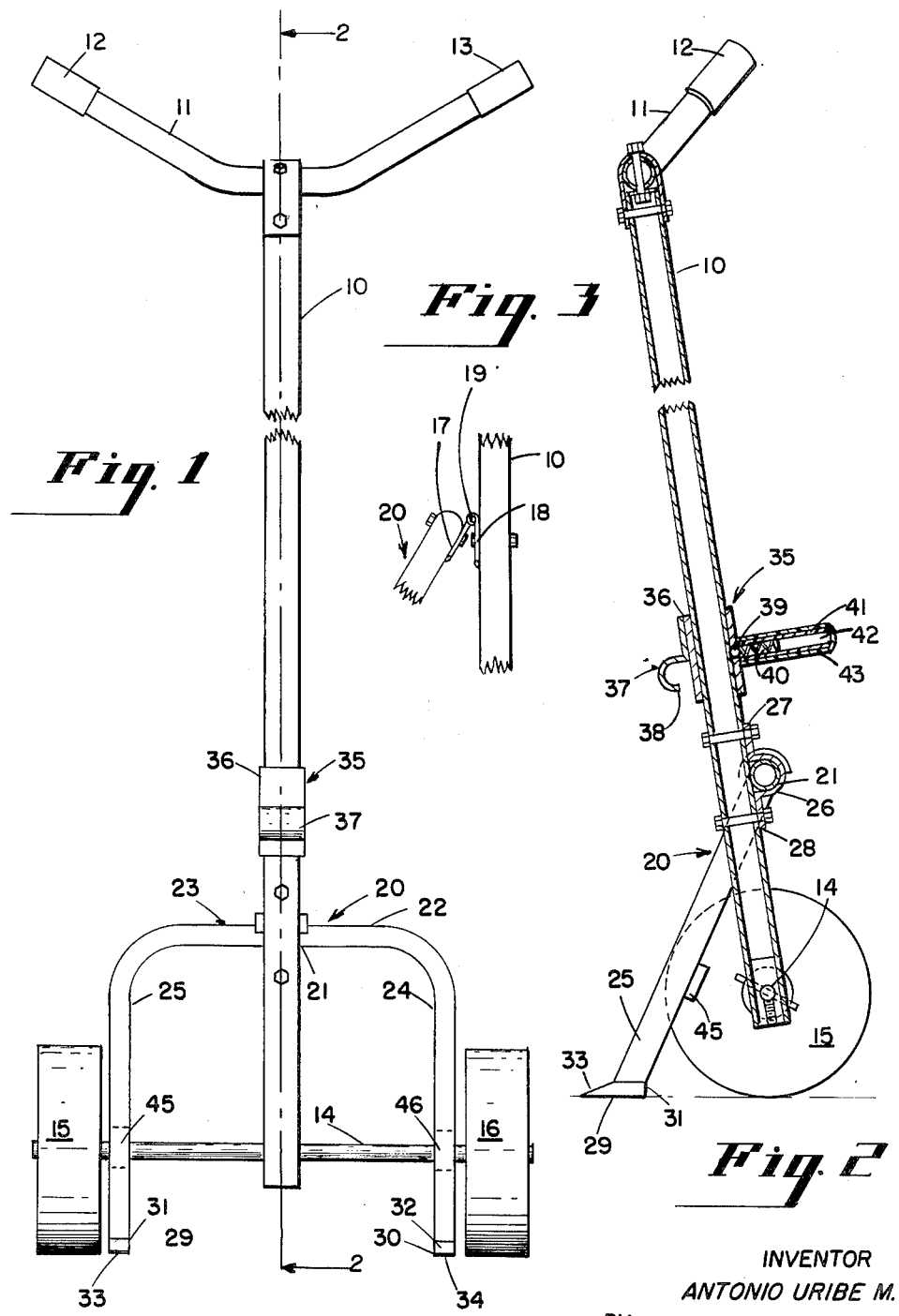
INVENTOR
ANTONIO URIBE M.
BY
J. F. Cuneo
ATTORNEY April 26, 1966 A. URIBE M. 3,247,989
BARREL TRUCK
Filed July 8, 1963 2 Sheets-Sheet 2
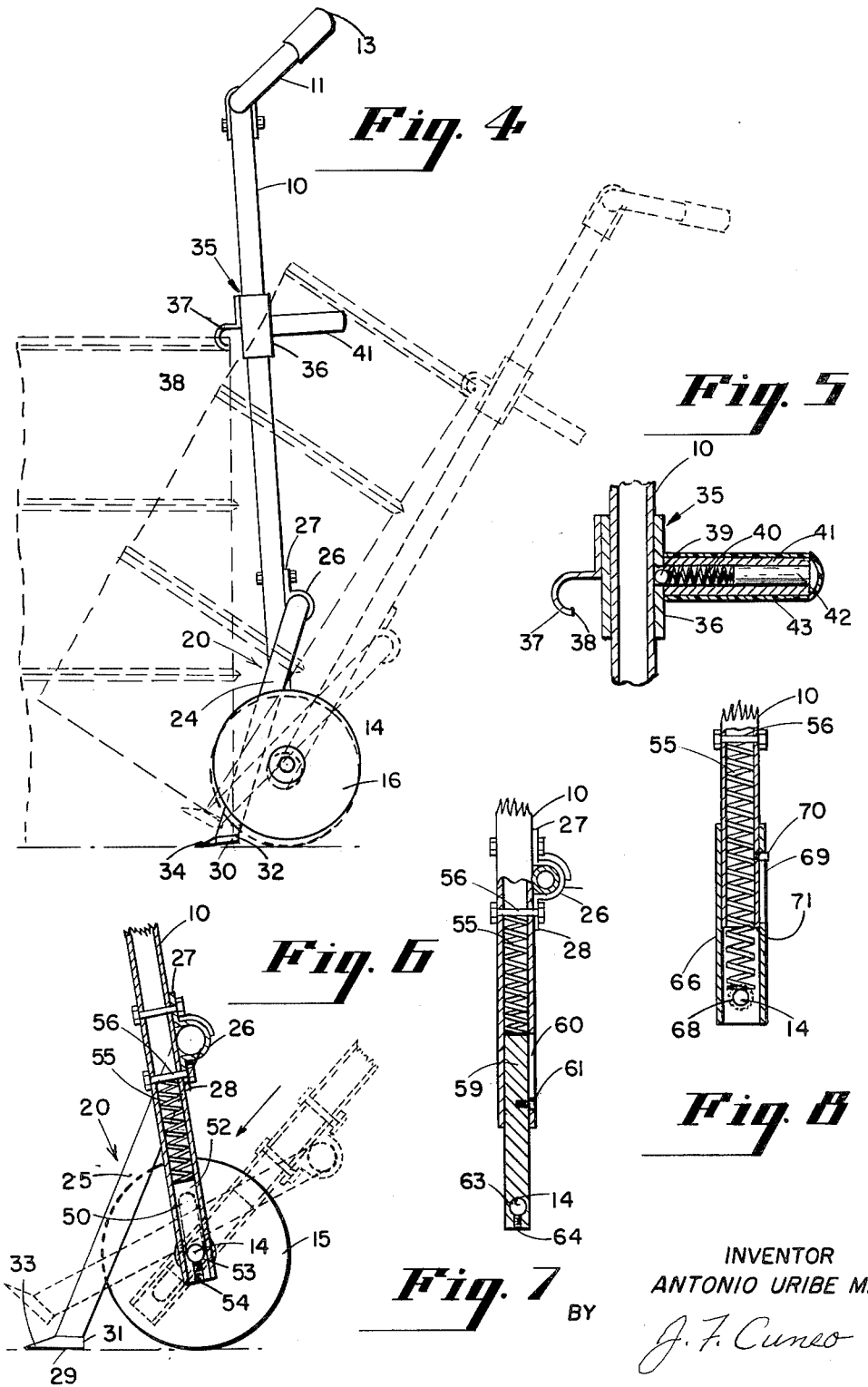
INVENTOR
ANTONIO URIBE M.
*J. F. Cuneo*
ATTORNEY United States Patent Office 3,247,989
Patented Apr. 26, 1966

3,247,989
BARREL TRUCK
Antonio Uribe M., 1131 E. Merced, West Covina, Calif.
Filed July 8, 1963, Ser. No. 293,437
10 Claims. (Cl. 214—383)

This invention relates to a novel hand truck construction and in particular to a hand truck adapted to load, move and unload heavy drums or barrels.

The truck is designed and constructed to be self loading and self unloading thereby making it possible for an operator to load and unload heavy barrels or drums without the necessity of having to physically grasp or wrestle the barrels. The balance of the truck can be easily controlled by the operator so as to place the center of gravity of the barrel or drum directly above the axis of the axle of the hand truck and only a slight pushing effort is required to move the loaded truck to the position where the barrel is to be deposited. When not in use the truck can be stood in a substantially vertical position and this permits the truck to be stored in a minimum of space.

A purpose of this invention is to provide a barrel truck that is light in weight, simple in construction, easy and inexpensive to manufacture, yet sturdy enough to handle heavy barrels.

Another purpose of this invention is to provide a drum or barrel truck that will load or unload a heavy barrel without the necessity of the operator having to physically wrestle with the drum or barrel to place it on or take it off the truck. The construction of the truck permits the transportation of the heaviest barrels with a minimum of effort.

A further purpose of my invention is to provide a barrel truck construction that will permit the truck to stand in substantially a vertical position when it is not in use, thereby requiring a minimum of storage space.

An added purpose of this invention is to provide a barrel truck construction that will place the axis of the axle near the end of the truck when the truck is unloaded, permitting it to stand substantially vertical, but will increase the distance between the end of the truck and the axis of the axle when the load is on the truck thereby insuring the maximum mechanical advantage, since the axis of the axle serves as the fulcrum.

An additional purpose of this invention is to provide a hand truck that will, when placed in its maximum horizontal position, also serve as a barrel rack for supporting drums and barrels in such a position that substantially complete drainage of the contents of the barrel is insured.

Other purposes of this invention become apparent after a review of the drawings and the detailed description in which:

FIG. 1 is a front elevational view of a barrel truck when standing in its substantially vertical position that it assumes when it is stored;

FIG. 2 is a view, partly in cross section taken on the line 2—2 of FIG. 1;

FIG. 3 shows an alternative method for pivotally attaching the barrel supporting and engaging member;

FIG. 4 is a view showing the various positions assumed by the barrel and barrel truck during the loading of a barrel and during the transportation after it has been placed on the truck;

FIG. 5 is a cross sectional view of a chime hook assembly;

FIG. 6 is a side elevational view, partly in cross section showing a modified form of truck standard in which the axle is slidable in the standard, only the lower portion of the truck is shown;

FIG. 7 is a side view, partly in cross section showing an alternative embodiment of the sliding axle arrangement shown in FIG. 6; only the lower portion of the standard with an axle support is shown;

FIG. 8 is a side elevational view, partly in cross section of another form of sliding axle arrangement, only the lower portion of the standard with the axle support being shown.

Referring to the drawings there is shown a centrally positioned tubular standard or post 10 extending substantially the length of the truck. Standard 10 is preferably rectangular in cross section, the standard in the illustrations being shown as square for convenience. Handle bar 11 is secured to the upper end of standard 10 by any suitable means such as a bolted coupling as is shown in FIGS. 1 and 2, or it may be welded, brazed or secured to standard 10 in any other conventional manner. The ends of handle bar 11 are provided with hand grips 12 and 13. That portion of handle bar 11 that is provided with these hand grips is preferably angled with respect to the longitudinal axis of standard 10 to facilitate handling of a heavily loaded truck.

If desired handle bar 11 and hand grips 12 and 13 could be omitted entirely and any other suitable means such as a hand grip at the end of standard 10 could be employed.

An axle 14 is provided near the lower end of standard 10 and is fixedly secured to the standard by any suitable means such as bolting, welding, brazing or the like. The axle extends laterally from each side of standard 10 and the axis of axle 14 is substantially normal to the longitudinal axis of standard 10. Wheels 15 and 16 are rotatably mounted on the ends of axle 14 by any convenient conventional method.

A barrel engaging and supporting member or frame 20, preferably tubular in construction is shown in FIGS. 1 and 2 as having a short central cylindrical portion 21. Portions 22 and 23 extend from their respective end of portion 21. Legs 24 and 25 continue from the ends of portions 22 and 23 and their longitudinal axes are substantially normal to the axis of central portion 21. The complete barrel engaging and supporting frame is shown as substantially U-shaped, however, any other suitable configuration may be used.

Barrel engaging and supporting member 20 is pivotally secured to standard 10 by means of a U-shaped bearing cap 26 that has outwardly extending ears 27 and 28 to permit securing the bearing cap to the standard. These ears may be bolted, welded, brazed, riveted or otherwise secured to standard 10; when cap 26 is secured and central portion 21 is in place, barrel support 20 is permitted pivotal movement. FIG. 3 shows another method of pivotally securing barrel engaging and supporting frame 20. Here the substantially U-shaped member is shown with its central portion fixedly secured to one element 17 of a hinge, while the other element of the hinge, 18, is fixedly secured to standard 10. Elements 17 and 18 are secured to their respective members by any conventional means such as bolting, welding, brazing or riveting and when so secured the U-shaped frame 20 will pivot on hinge pin 19 that holds the two elements of the hinge together.

The ends of leg portions 24 and 25 are each provided with a shoe 29 and 30 and are secured to heel portions 31 and 32 of the shoes respectively. The sole of each shoe is flat to insure good ground contact while the outwardly extending end portions or toes 33 and 34 are wedge shaped and terminate in a sharp point.

Standard 10 is provided with a chime hook assembly 35 comprising a collar portion 36 that surrounds standard 10 and is capable of sliding freely along the standard.

The inner configuration of the collar is preferably compatible with the cross section of the standard to prevent rotational movement thereon. Collar 36 is provided with a chime hook 37 that extends from one side thereof and has a point 38 adapted to engage the inner surface of the upper chime of a barrel as is shown in FIG. 4. Collar 36 is retained at the proper engaging position on standard 10 by means of an antifriction holding device such as is illustrated in FIG. 5. A ball 39 and spring 40 are confined in a retaining handle 41 that is also secured to collar 36 and is preferably located on the collar on the side that is opposite to the one from which chime hook 37 extends. One end of spring 40 is resting against ball 39 while the other end of spring 40 rests against a plug 42 that is also retained by handle 41. The plug shown in FIG. 5 may be held in place by any suitable means such as bolting, welding, riveting, a pin, or other satisfactory means. A grip 43 surrounding handle 41 may be used if desired.

The lower surfaces of legs 24 and 25 are preferably provided with rests 45 and 46 located at the proper position on the legs against which the upper surface of axle 14 would normally rest whenever barrel supporting frame 20 makes the maximum obtuse angle with the longitudinal axis of standard 10.

The manner in which the barrel truck operates is as follows: the truck is wheeled against a barrel to be moved until the sharp ends of the wedge portions 33 and 34 of shoes 29 and 30 come in contact with the bottom perimeter of the barrel to be moved. At this position the shoes and wheels 15 and 16 will all be simultaneously in contact with the ground, while standard 10 will be leaning toward the barrel as shown in FIG. 4 but chime hook 37 cannot engage the upper chime of the barrel until the standard is leaned further toward the barrel. When this is done wheels 15 and 16 will leave the ground and the ends of shoes 29 and 30 will alone contact the floor permitting the truck to pivot on these ends. The operator adjusts the position of collar 36 on standard 10 so that end 38 of the chime hook will rest against the bottom of the upper chime of the barrel. The operator then pulls hand grips 12 and 13 toward himself until the wheels again come in contact with the ground and the barrel is tilted toward the operator so that its axis is no longer vertical. In this position only one point of the lower chime of the barrel that is closest to the standard, will be in contact with the floor and this permits the wedge shaped portions of shoes 29 and 30 to slip between the lower perimeter of the barrel and the ground and eventually will permit the lower rim of the barrel to become seated on legs 24 and 25 with the outwardly extending toe portions of the shoes holding the barrel from slipping off.

The operator now increases the tilt of the truck and barrel using the axis of axle 14 as a fulcrum until the center of gravity of the barrel is placed directly over the axis of the axle. Prior to reaching this position the lower surfaces of legs 24 and 25 of the lower surfaces of stops 45 and 46 will have come to rest against axle 14. A minimum of pushing effort is required to move the barrel when it is supported in this position.

If the barrel and truck are lowered so that the truck is in its maximum horizontal position with the wheels and the end of handle 41 all in contact with the floor, the truck can be used as a barrel rack and the liquid in the barrel can be substantially completely discharged since the upper end of the barrel will be elevated slightly above the lower end to which the spigot is attached.

Another embodiment of the invention is shown in FIG. 6. In this embodiment axle 14 is mounted on a pistonlike member 52 that is adapted to slide freely within standard 10. The sides of standard 10, which is also tubular in this alternative, are provided with parallel slots 50 that extend longitudinally and are located near the lower end of standard 10. The slots are wide enough to permit passage of axle 14. Since pistonlike member 52 has a cross section that is compatible with the inner cross section of standard 10 and is provided with a transverse bore 53 that permits passage of axle 14, the axle can, when inserted in bore 53 slide up and down in standard 10, its total travel being limited by the longitudinal length of slots 50. The axle may be secured to member 52 by means of a set screw 54 as shown in FIG. 6, or it may be welded, brazed, pinned or otherwise secured to support 52.

Member 52 is preferably longer than the length of slots 50 and its upper end is acted upon by a compression spring 55 that is housed within standard 10. The opposite end of spring 55 rests against a retainer 56 which is shown as a bolt in the drawing that is secured transversely to standard 10. Spring 55 is sufficiently resilient to force pistonlike member 52 and axle 14 so that the axle will come to rest against the lower end of slots 50 whenever there is no load on the truck. This permits the truck to be stood in a substantially vertical position when there is no load. When the truck is loaded the spring will become compressed and the axle will travel to the upper ends of slots 50 thereby increasing the distance between the ends of legs 24 and 25, against which the bottom of a barrel will rest and the axis of axle 14. The added distance will help increase the mechanical advantage of the system and will reduce the amount of force that an operator must exert to initially break a barrel from its vertical position.

An alternative construction also embodying a sliding axle is shown in FIG. 7. A pistonlike axle supporting member 59 is proportioned to slide snugly within standard 10, a slot, or a plurality of slots 60 are provided in a side or sides of standard 10 and are made long enough to insure the required movement. A bolt 61 is threaded into supporting member 59 at the proper position and the head of bolt 61 that is round and has the same diameter as the width of slot 60 so as to permit it to slide in slot 60, yet hold supporting member 59 and standard 10 assembled at all times. The lower end portion of member 59 is provided with a transverse bore 63 through which axle 14 passes. The axle is secured to the bore by any suitable means such as a set screw 64, or may be held by any other suitable means such as welding, pinning, brazing, side nuts or the like. Axle 14 is intended to come to rest against the bottom of standard 10 whenever the truck is loaded.

A spring 55, similar to the one employed in FIG. 6 is used in this embodiment to force the axle to its maximum extended position whenever the truck is not loaded and is to be restored to its substantially vertical position. The upper end of spring 55 again rests against a retaining bolt 56 as in the previous construction, while the lower end of spring 55 rests against the end of supporting member 59. The apparatus operates in the same manner as the device shown in FIG. 6.

Another alternative construction is illustrated in FIG. 8. In this embodiment axle support 66 surrounds standard 10 and is essentially a tube having an internal opening sufficient to permit standard 10 to slide therein. One or more wall of axle support 66 is provided with a slot 69 that is long enough to permit the required relative movement between support 66 and standard 10. Bolt 70 has a head that is proportioned to slide in slot 69 and is secured to standard 10; this permits the support and standard to remain engaged at all times.

Axle 14 is secured to the lower end of tubular support 66. The axle pasess through a transverse bore 68 in tubular support 66 and is fastened to the support by any suitable means such as snap rings and groove combinations, a bolt or pin, retaining nuts or by simply welding or brazing the axle to the support as is shown in FIG. 8. End 71 of standard 10 will rest against the upper side of axle 14 when a weight is on the truck and standard 10 is at its position of maximum advancement toward the bottom of support 66.

One end of a spring 55 rests against axle 14 while the other end of the spring is against retainer bolt 56. In other respects this apparatus operates in the same manner as was described in FIGS. 6 and 7.

While the invention has been described in detail with respect to the illustrative examples and embodiments described, it is understood that various changes and modifications may be made without departing from the spirit of the invention or the scope thereof, and it is intended therefore to cover all such changes and modifications in the appended claims.

I claim:

1. A barrel truck comprising: a standard; a handle at one end of the standard; an axle secured to the other end of said standard and extending laterally from each side thereof, the axis of said axle being substantially normal to the longitudinal axis of the standard; a wheel rotatably mounted at each end of said axle; a substantially U-shaped barrel supporting member having a central portion, said central portion being pivotally attached to said standard in spaced relationship to said axle, and said handle, corresponding positions on each leg of said U-shaped barrel supporting member being substantially equidistant from said axis for any position of the barrel supporting member, said legs contacting the axle when the U-shaped barrel supporting member forms the maximum obtuse angle with said standard; a shoe secured to the end of each leg of said U-shaped member, each shoe having a wedgelike toe portion extending above the plane of said U-shaped barrel supporting member and adapted to engage the lower chime of a barrel when the longitudinal axis of the barrel is inclined at an angle to the vertical; a collar member slidable along said standard, said collar member having a cross section that substantially corresponds to the cross section of said standard; a chime hook secured to one side of said collar member for engaging the upper chime of a barrel; and means attached to said collar member for maintaining said collar member at a predetermined position on said standard.

2. A barrel truck comprising: a standard; a handle at one end of the standard; an axle secured to the other end of said standard and extending laterally from each side thereof; the axis of said axle being substantially normal to the longitudinal axis of said standard; a wheel rotatably mounted at each end of said axle; a substantially U-shaped barrel supporting member having a central cylindrical portion, said central cylindrical portion being pivotally secured to said standard in spaced relationship to said axle, and said handle, corresponding position on each leg of said U-shaped barrel supporting member being substantially equidistant from said axle for any position of said barrel supporting member, the legs contacting said axle when said U-shaped member forms the maximum obtuse angle with said standard; a shoe secured to the end of each leg of said U-shaped barrel supporting member, each shoe having a wedgelike toe portion extending above the plane of said U-shaped member and adapted to engage the lower chime of a barrel when the longitudinal axis of the barrel is inclined at an angle to the vertical; a collar member slidably mounted on said standard, said collar member having a cross section compatible to the cross section of said standard; a chime hook secured to one side of said collar member for engaging the upper chime of a barrel; and means associated with said collar for maintaining said collar member at a predetermined position on said standard.

3. A barrel truck according to claim 2 wherein the means associated with the collar for maintaining said collar in a predetermined position on said standard are frictional means acting on a side of said standard.

4. A barrel truck according to claim 2 wherein the handle end of said standard is provided with a handlebar.

5. A barrel truck according to claim 2 wherein the standard is tubular and rectangular in cross section and wherein said collar means is provided with a handle, said handle housing frictional means for holding said collar member in a predetermined position on said standard.

6. A barrel truck according to claim 2 wherein the U-shaped barrel supporting member has an axle engaging rest provided on the corresponding contact portion of each leg thereof.

7. A barrel truck comprising: a standard; a handle at one end of said standard; an axle supporting member, said axle supporting member being slidably mounted on the other end portion of the standard to permit relative longitudinal movement between them; means for retaining said axle supporting member and the end portion of said standard in sliding cooperation with each other while limiting the relative movement between them; an axle secured to said axle supporting member near one end thereof, said axle extending laterally from each side of the axle supporting member; means associated with said axle supporting member and the end portion of said standard for urging the axle supporting member to its maximum extended position whenever there is no load on said barrel truck; a substantially U-shaped barrel supporting member having its central portion pivotally connected to said standard in spaced relationship to the end of the standard supporting the axle supporting member, and the handle end, corresponding portions of each leg of the U-shaped barrel supporting member being substantially equidistant from said axle at any position of said barrel supporting member, the legs making contact with said axle whenever the U-shaped barrel supporting member is disposed at the maximum obtuse angle with said standard; a shoe secured to the end of each leg of the U-shaped barrel supporting member, each shoe having a wedgelike toe portion adapted to engage the lower chime of a barrel whenever the longitudinal axis of the barrel is inclined at an angle to the vertical; a collar member slidable along said standard and surrounding said standard; a chime hook secured to one side of said collar for engaging the upper chime of a barrel; and frictional means attached to said collar for maintaining said collar in a predetermined position on said standard; and a wheel rotatably mounted on each end of said axle.

8. A barrel truck comprising a tubular standard; a handle at one end of said tubular standard; an axle supporting member slidably mounted within the opposite end of said tubular standard openings extending longitudinally on each side of the tubular standard in spaced relationship with the lower end thereof; an axle secured to said axle supporting member near one end thereof, said axle extending laterally from each side thereof, said axle passing through said longitudinally extending openings in the sides of the tubular standard capable of sliding in said longitudinally extending openings; spring means within said tubular standard for urging the supporting member and the axle against the ends of said longitudinal openings that are adjacent the lower end of said tubular standard whenever the barrel truck is not loaded; a wheel rotatably mounted on each end of said axle; a substantially U-shaped barrel supporting member having a central portion pivotally connected to said standard in spaced relationship to the upper end of the longitudinally extending openings in the standard, and said handle end, corresponding portions of each leg of the U-shaped member being substantially equidistant from said axle at any position of the barrel supporting member, said legs making contact with the axle whenever the U-shaped barrel supporting member is disposed at the maximum obtuse angle with said standard; a shoe secured to the end of each leg of said U-shaped member, each shoe having a wedgelike toe portion adapted to engage the lower chime of a barrel whenever the longitudinal axis of the barrel is inclined at an angle with the vertical; a collar member slidable along said standard and surrounding said standard; a chime hook secured to one side of said collar for engaging the upper chime of a barrel; and frictional means attached to a side of said collar for maintaining said collar at a predetermined position on said standard.

9. A barrel truck comprising: a tubular standard; a handle at one end of said tubular standard; an axle supporting member slidably mounted within said tubular standard at the other end thereof, a portion of the axle supporting member extending outside the standard at all times; an axle secured to the portion of the axle supporting member that is outside said standard and extending laterally from each side of said axle supporting member; means cooperating with said standard and said axle supporting member for slidably securing the axle supporting member to said standard; spring means within said standard and acting upon the inner end of the axle supporting member for urging said axle supporting member to its maximum extended position beyond the end of said standard; when said barrel truck is not loaded; a wheel rotatably mounted on each end of said axle; a substantially U-shaped barrel supporting member having a central portion pivotally connected to said standard in spaced relationship to the end of said standard supporting the axle supporting member, and said handle end, corresponding portions of each leg of the U-shaped member being in contact with said axle whenever the U-shaped barrel supporting member is disposed to form the maximum obtuse angle with said standard; a shoe secured to the end of each leg of said U-shaped member, each shoe having a wedgelike toe portion adapted to engage the lower chime of a barrel whenever the longitudinal axis of the barrel is inclined at an angle to the vertical; a collar member slidable on said standard and surrounding the standard; a chime hook secured to a side of said collar for engaging the upper chime of a barrel; and frictional means attached to said collar for holding said collar at a predetermined position on said standard.

10. A barrel truck comprising: a standard; a handle at one end of said standard; an axle supporting member provided with an axial passageway proportioned to slidably receive the other end of said standard; means associated with said standard and said axle supporting member for retaining said axle supporting member in slidable relationship with said standard; an axle secured to said axle supporting member in spaced relationship with the lower end of the axle supporting member, said axle extending laterally from each side thereof; a wheel rotatably mounted on each side of said axle; resilient means within said standard, the upper end of the resilient means resting against a retaining means associated with said standard, the bottom of said resilient means resting against said axle, the resilient means urging the axle supporting member to its maximum extended position beyond the end of the standard when the load on the truck does not exceed the force exerted by the resilient means; a substantially U-shaped barrel supporting member having a central portion pivotally connected to said standard in spaced relationship to the end of said standard supporting the axle supporting member, and the handle end, the leg portions of the U-shaped member resting against the axle whenever the U-shaped member is disposed to form the maximum obtuse angle with said standard; a shoe having a wedgelike toe portion and secured to the end of each leg of the barrel supporting member, said wedgelike toe portion being adapted to engage the lower chime of a barrel whenever the longitudinal axis of the barrel is inclined at an angle with the vertical; a collar member slidable on said standard and surrounding said standard; a chime hook secured to a side of said collar member for engaging the upper chime of a barrel; and frictional means associated with said collar member for holding said collar at a predetermined position on said standard.

References Cited by the Examiner

UNITED STATES PATENTS

| 1,513,863 | 11/1924 | Sabin | 214—383 |
| 2,150,503 | 3/1939 | Hawkins | 214—383 |
| 2,346,649 | 4/1944 | Bilek | 214—383 |
| 2,574,825 | 11/1951 | Guild | 214—383 |
| 2,682,347 | 6/1954 | Jackson | 214—147 |

FOREIGN PATENTS

| 601,193 | 4/1948 | Great Britain. |

GERALD M. FORLENZA, *Primary Examiner.*

MORRIS TEMIN, *Examiner.*